US008275789B2

(12) United States Patent
Kirby

(10) Patent No.: US 8,275,789 B2
(45) Date of Patent: Sep. 25, 2012

(54) COLLABORATIVE BOOKMARKING

(75) Inventor: Christopher W. Kirby, Winnipeg (CA)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/334,711

(22) Filed: Dec. 15, 2008

(65) Prior Publication Data
US 2010/0153364 A1  Jun. 17, 2010

(51) Int. Cl.
*G06F 7/00* (2006.01)
(52) U.S. Cl. ........................................ 707/781
(58) Field of Classification Search ................... None
See application file for complete search history.

(56) References Cited

U.S. PATENT DOCUMENTS

| | | | |
|---|---|---|---|
| 6,427,175 B1 * | 7/2002 | Khan et al. ..................... 709/245 |
| 6,493,702 B1 * | 12/2002 | Adar et al. ..................... 707/706 |
| 6,631,496 B1 * | 10/2003 | Li et al. ........................ 715/200 |
| 6,725,227 B1 * | 4/2004 | Li ........................................ 1/1 |
| 7,031,961 B2 * | 4/2006 | Pitkow et al. ........................ 1/1 |
| 7,185,192 B1 * | 2/2007 | Kahn ............................ 713/155 |
| 7,899,829 B1 * | 3/2011 | Malla ........................... 707/741 |
| 7,921,124 B1 * | 4/2011 | Bickerstaff .................... 707/754 |
| 2002/0083342 A1 * | 6/2002 | Webb et al. ................... 713/201 |
| 2004/0225716 A1 * | 11/2004 | Shamir et al. ................ 709/204 |
| 2005/0256866 A1 * | 11/2005 | Lu et al. ............................ 707/5 |
| 2005/0289127 A1 * | 12/2005 | Giampaolo et al. .............. 707/3 |
| 2006/0206480 A1 * | 9/2006 | Heidloff et al. ................... 707/6 |
| 2006/0265381 A1 * | 11/2006 | Altaf et al. ..................... 707/10 |
| 2006/0294192 A1 * | 12/2006 | Mao et al. ..................... 709/213 |
| 2007/0011155 A1 * | 1/2007 | Sarkar ............................... 707/5 |
| 2007/0124208 A1 * | 5/2007 | Schachter et al. .............. 705/14 |
| 2008/0086471 A1 * | 4/2008 | Ritter et al. ........................ 707/8 |
| 2008/0114729 A1 * | 5/2008 | Raman et al. ..................... 707/3 |
| 2008/0301222 A1 * | 12/2008 | Schneider ..................... 709/203 |
| 2009/0198506 A1 * | 8/2009 | Gupta .............................. 705/1 |
| 2009/0216805 A1 * | 8/2009 | Coffman et al. ........... 707/104.1 |
| 2010/0082677 A1 * | 4/2010 | Athsani et al. ................ 707/783 |

OTHER PUBLICATIONS

Hayman, Sarah "Folksonomies and Tagging: New developments in social bookmarking," Jun. 27-29, 2007, Ark Group Conference: Developing and Improving Classification Schemes, Rydges World Square, Sydney.*
Gotta et al., "Trends in Social Software," Jun. 26, 2006, Burton Group, Collaboration and Content Strategies In-Depth Research Overview.*
Steve Eisner, Our experience with enterprise tagging terminology, http://www.ihol.org/blog/index.php/2006/05/22/our-experience-with-enterprise-tagging-terminology, May 2006.
Millen et al, Dogear: Social Bookmarking in the Enterprise, CHI 2006 Proceedings, Social Computing 1, Apr. 22-27, 2006, Montreal, Quebec, Canada, pp. 111-120.

(Continued)

*Primary Examiner* — Fred I Ehichioya
*Assistant Examiner* — Richard Bowen
(74) *Attorney, Agent, or Firm* — George R. McGuire; David B. Woycechowsky; Bond Schoeneck & King

(57) ABSTRACT

A method and system for filtering tags in a collaborative bookmarking system wherein the collaborative bookmarking system includes confidential and/or proprietary information, whereby tag filters prevent access to certain confidential and/or proprietary information by permitting a user access to the collaborative bookmarking system, authenticating the user, permitting the user to submit a search request to the collaborative bookmarking system, whereby the search request retrieves search result tags, and filtering the search result tags to provide only authorized tags to the user.

3 Claims, 2 Drawing Sheets

OTHER PUBLICATIONS

Mike Butcher, Cogenz social bookmarking for the enterprise, http://uk.techcrunch.com/2006/09/13/cogenz-social-bookmarking-for-the-enterprise/ Sep. 13, 2006.

Damianos, et al, Onomi: Social Bookmarking on a Corporate Intranet http://www.mitre.org/work/tech_papers/tech_papers_06/06_0352/, May 2006.

* cited by examiner

COLLABORATIVE BOOKMARKING

TECHNICAL FIELD

The present invention relates generally to methods and systems for collaborative bookmarking, and particularly to methods and systems for managing a collaborative bookmarking system.

BACKGROUND

Collaborative bookmarking is a growing phenomenon within the world-wide web. Users of a collaborative bookmarking site contribute to the site by associating, or "tagging" uniform resource locators (URLs) for web-accessible content with descriptive phrases and key words, or tags. A tag is a non-hierarchical keyword or term assigned to a piece of information (such as an internet bookmark, digital image, or computer file). This kind of metadata helps describe an item and allows it to be found again by browsing or searching. Tags are chosen informally and personally by the item's creator or by its viewer, depending on the system. On a website in which many users tag many items, this collection of tags becomes a folksonomy, also known as social classification, social indexing or social tagging.

The contributions of the site users are typically displayed as a single page, random arrangement of tags commonly referred to as a tag cloud. This is exemplified by collaborative bookmarking sites such as delicious.com and flickr.com. Collaborative bookmarking sites typically allow users to explore the entire tag cloud within the site or to explore the tag clouds of individual site contributors.

Bookmarking sites allow individuals to create personal collections of bookmarks and easily share their bookmarks with others. These centrally stored collections can be accessed from a web-connected machine. These systems all have the ability to display tag clouds that represent the contributions of all of a collaborative bookmarking site's users. Tags that are explicitly entered by the user for each bookmark allow the individual user to organize and display the collection with meaningful labels. Furthermore, multiple tags allow bookmarks to belong to more than one category, a limitation of traditional hierarchically organized folders found in most web browsers. Although bookmark collections are personally created and maintained, they are typically visible to others. A number of user interface elements allow social browsing of the bookmark space. For example, user names are "clickable" links; clicking on a name reveals the bookmark collection for that user. This allows someone to get a sense of the topics of interest for a particular user. Similarly, tags are also clickable, and when selected will result in a list of all bookmarks that share that tag. This is a useful way to browse through the entire bookmark collection to see if it includes information sources of interest.

These systems also have the ability to display the relative number of contributions and/or activity of contributions by varying the weight, size, color, and style of the fonts used to display tags within a tag cloud. For example, a tag that refers to twice as much content as another tag may be shown using a larger font than the other tag.

Moreover, there are other systems, such as the Mooter search engine, that enable the automated discovery and presentation of related topics within a group of web-accessible content but these rely on automated topic discovery (topics are analogous to tags) through parsing of web content. This results in a narrow set of topics that does not represent the wide variety of viewpoints observed in a social bookmarking solution.

Corporations are beginning to deploy collaborative bookmarking technology as a means of tracking and propagating expertise within their enterprises. Examples of corporate bookmarking solutions include IBM's Dogear, and Mitre's Onomi social bookmarking system.

Collaborative bookmarking systems used in the corporate environment have proven valuable for: 1) providing research analysts with a place to share research findings; 2) fueling expertise finding and user profiling; 3) helping to form and support social networks around interest areas; 4) enhancing the value of other information retrieval and aggregation capabilities on a company's intranet; and 5) influencing or augmenting corporate subject taxonomy strategies.

By their nature, corporate tag clouds will be comprised of publicly available web content as well as content that is proprietary and confidential to the enterprise and should not be available to the general public. While there are solutions that could be potentially applied to this problem, they suffer from a number of shortcomings. HTTP servers typically enable corporations to restrict the content accessible to public users by forcing users to authenticate themselves in order to access restricted URLs. This approach is not sufficient for a collaborative tagging environment since it only restricts access to a URL once it has been returned to the user and subsequently requested. This constitutes both a security risk (users become aware of restricted content and may be able to infer information from content titles even if they are restricted from viewing the content) and a usability risk (users will become frustrated if many of the tagged URLs are inaccessible to them).

HTTP servers typically provide the ability to 're-write' URLs using a relatively simple grammar. This could be used to filter or perhaps obfuscate restricted content but rewriting implementations are not generally able to rewrite the content referenced by a URL, only the URLs requested by users. This introduces the same security risk as HTTP server security.

Reverse proxy or bastion servers typically used in web single sign-on solutions also restrict access to web content. Again, these suffer the shortcoming that URLs are only restricted once they are requested by a user.

It is an object of the invention to provide a means by which public or private entities can maintain a single collaborative bookmarking site to service internal staff, business partners, and members of the public such as consumers.

SUMMARY

According to one embodiment of the present invention, a collaborative bookmarking system is provided wherein the collaborative bookmarking system includes confidential and/or proprietary information whereby a method of filtering tags to prevent access to certain confidential and/or proprietary information includes permitting a user access to the collaborative bookmarking system, authenticating the user, permitting the user to submit a search request to the collaborative bookmarking system, whereby the search request retrieves search result tags, and filtering the search result tags to provide only authorized tags to the user.

In a further aspect of the method, the step of authenticating the user includes determining the amount of access to the content in the bookmarking system provided to the user.

In yet another aspect of the method, the tags in the bookmarking system include uniform resource locators (URLs) and URL elements and each tag filter includes a predefined list of URLs and URL elements, wherein the filtering step compares the search result tags with the predefined list of URLs and URL elements and prevents access to the search result tags that match the predefined list of URLs and URL elements.

In still a further aspect of the method, each tag filter includes a predefined list of tags and tag expressions, wherein the filtering step compares the search result tags with the predefined list of tags and tag expressions and prevents access to the search result tags that match the predefined list of tags and tag expressions.

In another aspect of the method, each tag filter includes a predefined list of tags and tag expressions that denote restricted URLs, wherein the filtering step compares the search result tags with the predefined list of tags and tag expressions that denote restricted URLs and prevents access to the search result tags that match the predefined list of tags and tag expressions that denote restricted URLs.

In one more aspect of the method, each tag filter includes a predefined list of site contributors and contributor expressions, wherein the contributors contribute tags that are restricted, wherein the filtering step compares the contributors of the search result tags with the predefined list of contributors and contributor expressions and prevents access to the search result tags that have contributors that match the predefined list of contributors and contributor expressions.

In a further aspect of the method, users access the collaborative bookmarking system by a public internet, private intranet or partner intranet.

In another embodiment of the invention, a system for collaborating tags in a bookmarking system is provided whereby the system is operated by a public or private entity, wherein the bookmarking system includes a plurality of tags applied to content items by a plurality of users, wherein the bookmarking system restricts certain tags from certain users, the system including one or more user interfaces, a collaborative bookmarking database linked to the one or more users interfaces, wherein users utilize the one or more user interfaces to search the collaborative bookmarking database to obtain search result tags, one or more servers linked to the collaborative bookmarking database, one or more networks linked to the servers and to the user interfaces, one or more authentication servers linked to the one or more servers, one or more tag filters linked to the one or more filters, wherein the one or more tag filters filter the search result tags to provide only authorized tags to the user.

In a further aspect of the system, the one or more servers include hyper-text transfer protocol (HTTP) servers and the one or more networks include a public internet, a private intranet and/or a partner intranet.

In another aspect of the system, the one or more authentication servers determine the amount of access to the content in the bookmarking system provided to the user.

In yet a further aspect of the system, the tags in the bookmarking system include uniform resource locators (URLs) and URL elements, and each tag filter includes a predefined list of URLs and URL elements, wherein each tag filter compares the search result tags with the predefined list of URLs and URL elements and prevents access to the search result tags that match the predefined list of URLs and URL elements.

In still another aspect of the system, each tag filter includes a predefined list of tags and tag expressions and each tag filter compares the search result tags with the predefined list of tags and tag expressions and prevents access to the search result tags that match the predefined list of tags and tag expressions.

In one more aspect of the system, each tag filter includes a predefined list of tags and tag expressions that denote restricted URLs and each tag filter compares the search result tags with the predefined list of tags and tag expressions that denote restricted URLs and prevents access to the search result tags that match the predefined list of tags and tag expressions that denote restricted URLs.

In still a further aspect of the system, each tag filter includes a predefined list of site contributors and contributor expressions, wherein the contributors contribute tags that are restricted, and each tag filter compares the contributors of the search result tags with the predefined list of contributors and contributor expressions and prevents access to the search result tags that have contributors that match the predefined list of contributors and contributor expressions.

In another embodiment of the invention, a computer program product encoded in a computer readable medium having program code for instructing a system to filter tags in a collaborative bookmarking system is provided wherein the collaborative bookmarking system includes confidential and/or proprietary information, the program code configured to cause the computer to perform the method including permitting a user access to the collaborative bookmarking system, authenticating the user, permitting the user to submit a search request to the collaborative bookmarking system, whereby the search request retrieves search result tags, and filtering the search result tags to provide only authorized tags to the user.

In another aspect of the computer program product, the tags in the bookmarking system include uniform resource locators (URLs) and URL elements, and each tag filter includes a predefined list of URLs and URL elements, wherein the filtering step compares the search result tags with the predefined list of URLs and URL elements and prevents access to the search result tags that match the predefined list of URLs and URL elements.

In yet another aspect of the computer program product, each tag filter includes a predefined list of tags and tag expressions and wherein the filtering step compares the search result tags with the predefined list of tags and tag expressions and prevents access to the search result tags that match the predefined list of tags and tag expressions.

In a further aspect of the computer program product, each tag filter includes a predefined list of tags and tag expressions that denote restricted URLs, and wherein the filtering step compares the search result tags with the predefined list of tags and tag expressions that denote restricted URLs and prevents access to the search result tags that match the predefined list of tags and tag expressions that denote restricted URLs.

In another aspect of the computer program product, each tag filter includes a predefined list of site contributors and contributor expressions, wherein the contributors contribute tags that are restricted, and wherein the filtering step compares the contributors of the search result tags with the predefined list of contributors and contributor expressions and prevents access to the search result tags that have contributors that match the predefined list of contributors and contributor expressions.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

Embodiments of the invention provide a system and method for managing tags in a collaborative bookmarking application.

Figure 1:
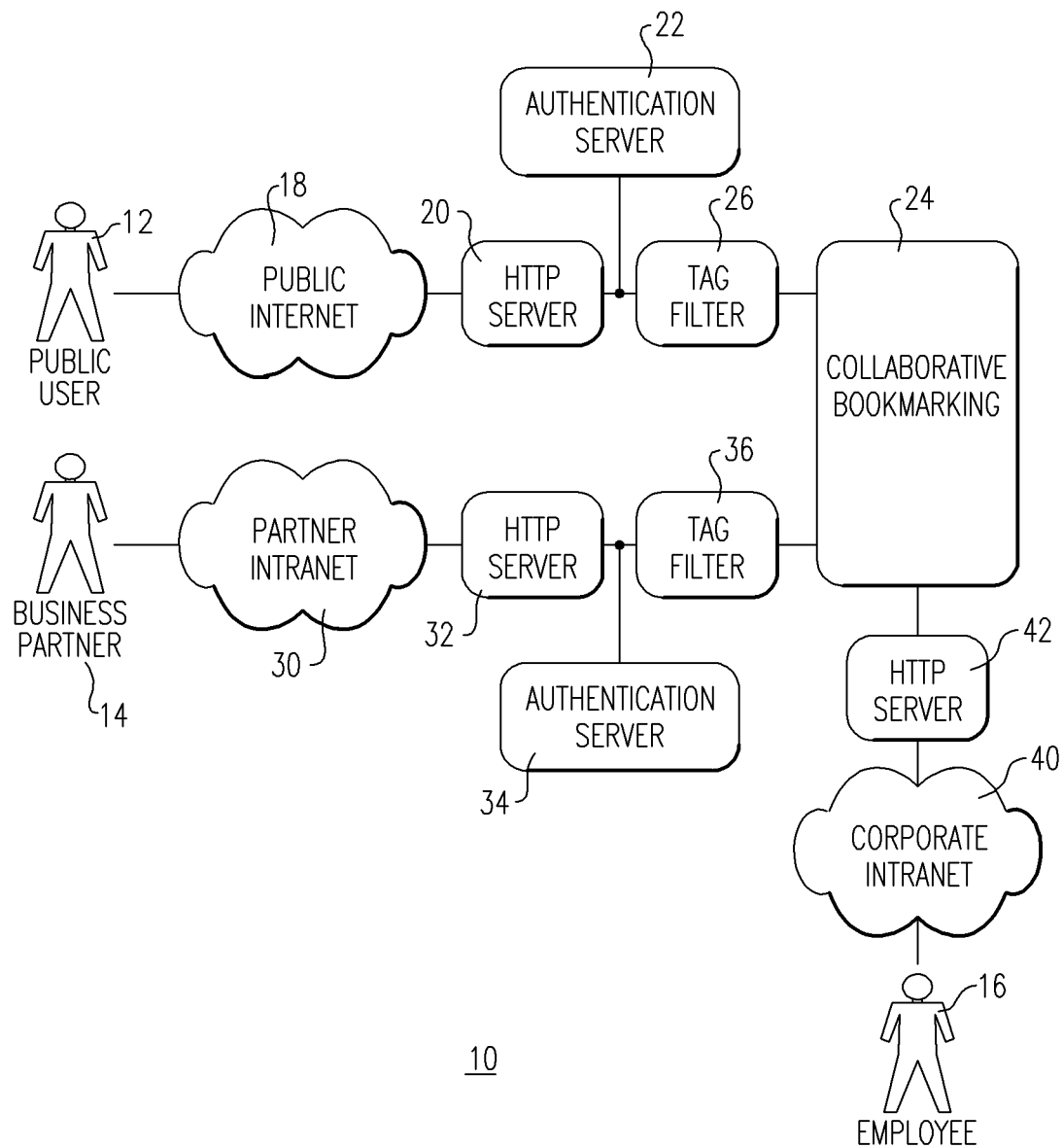
FIG. 1 shows a schematic diagram of an embodiment of a system of the invention and FIG. 2 is a flowchart of a method according to the present invention.
Figure 2:
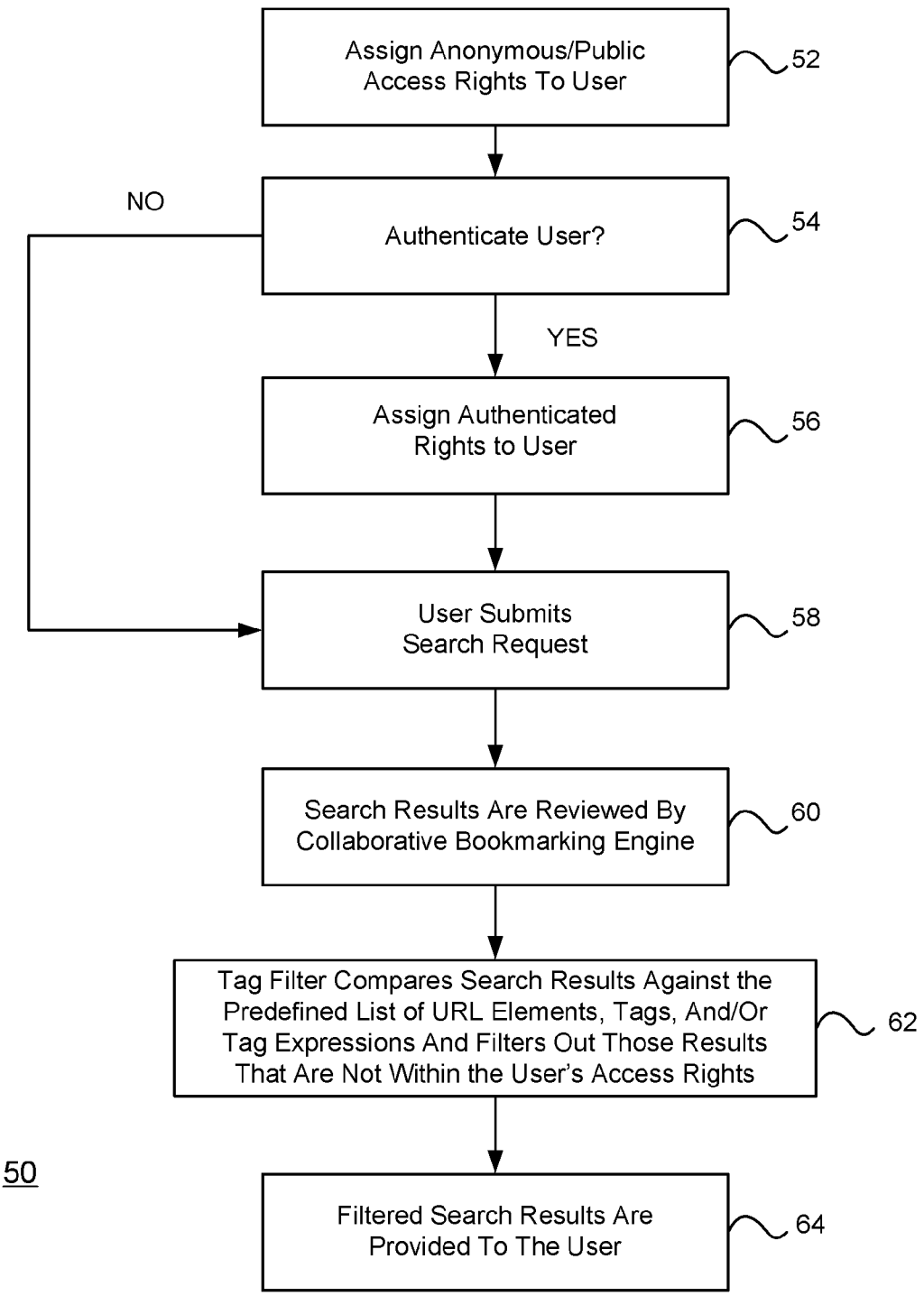

Reference is made to FIG. 1, which shows an embodiment of a collaborative bookmarking system 10. System 10 is operated by an entity, such as a corporation that would like to restrict certain tagged information from being viewed by entities not in the corporation. As shown in FIG. 1, three users, a public user 12, a business partner 14, and a corporate employee 16, have access to system 10, although the system is in no way limited to a specific number of users and many users may have access to system 10. The owner of system 10 determines which content shall be viewed by the users. For example, public users 12 will most likely be restricted from viewing certain confidential company information. Likewise, business partners 14 may have access to certain confidential company information, but not highly confidential company information.

Public user 12 can access system 10 through the public internet 18 using an HTML browser or similar content rendering device that is supported by a corporation's HTTP server 20. It should be mentioned that public user 12 is just one example of a user that accesses system 10 through public internet 18. Many users may access system 10 through public internet 16. An authentication server 22 is linked to HTTP server 20 and serves to authenticate the identity of public user 12. Examples of authentication servers include, but are not limited to enterprise single sign-on solutions such as Tivoli Access Manager and Microsoft ActiveDirectory, and the HTTP basic authentication method implemented in most HTTP servers. Once authenticated, public user 12 is allowed to submit a search request. A search request is submitted to the collaborative bookmarking database 24 and search results are returned through tag filter 26.

Since user 12 is a public user, there are restrictions regarding which uniform resource locators (URLs) user 12 is allowed to access. Tag filter 26 filters the search results by comparing tagged URLs against a pre-defined list of URL's and URL elements (including hosts names, content paths, and content names using both full elements and regular expressions) whose access or distribution is to be restricted. Tagged URL's that match an entry on the pre-defined list will not be returned to users who are not explicitly authorized to view the content referenced by the URL.

In addition to comparing URLs, the requested tags are compared against a pre-defined list of tags and tag expressions (regular expressions that match one or more tags) which are to be restricted. Tags that match an entry on this list will not be returned to users who are not explicitly authorized to view the tags.

A third measure to restrict unauthorized users access to proprietary tags includes comparing tags against a pre-defined list of tags and tag expressions (regular expressions that match one or more tags) that denote restricted URLs. URLs associated with a matching tag will not be returned to the users who are not explicitly authorized to view the tagged URL.

A further measure includes comparing the site contributors of a tag to a pre-defined list of contributors and contributor expressions (regular expressions that match one or more site contributors) whose tags are to be restricted. The filter will return only those tags (and associated content) that have had at least one allowed contributor.

Tag filter 26 is incremental in enforcing access control policies for web content that is proprietary, or confidential, or whose distribution the corporation wishes to control or otherwise restrict.

Further reference to FIG. 1 shows a business partner 14 linked to a partner intranet 30. Business partner 14 can access system 10 through the partner intranet 30 using an HTML browser or similar content rendering device that is supported by a corporation's HTTP server 32. It should be mentioned that business partner 14 is just one example of a user that accesses system 10 through partner intranet 30. All members of the business partner's entity may access system 10 through partner intranet 30. An authentication server 34 is linked to HTTP server 32 and serves to authenticate the identity of business partner 14. Once authenticated, business partner 14 is allowed to submit a search request. A search request is submitted to the collaborative bookmarking database 24 and search results are returned through tag filter 26.

Similar to the description of tag filter 26, tag filter 36 filters tagged results that are restricted from viewing by business partner 14, using the measures described above. Compared to public user 12, business partner 14 may have more access to tagged results due to the closer business relationship it has with the corporation.

Employee 16 is connected to the corporate intranet 40 and accesses system 10 through the corporate intranet using an HTML browser or similar content rendering device that is supported by a corporation's HTTP server 42. Employee 16 is representative of all users in the corporation that have access to the collaborative bookmarking database 24. There is no need for an authentication server since employee 16 works for the corporation. All search requests submitted to the collaborative bookmarking database 24 are returned unfiltered due to employee 16's status as a member of the corporation.

Although there is no tag filter present for the employees of the corporation, a tag filter can be employed for all user audiences, including employees to control access to collaboratively bookmarked content. For instance, there may be information in collaborative bookmarking database 24 that may only be viewed by upper management in the corporation. Accordingly, a tag filter can be connected to HTTP server 42 to restrict viewing of extremely confidential company information by certain employees 16.

It should also be mentioned that the components in system 10 can be implemented by a single instance of an application or through multiple installations of one or more applications. Components can be installed on any number of physical servers, i.e. the components may be installed on separate servers, collocated on a single server, or installed separately and collocated in any combination of the two options. Lines between the components represent logical communication paths, likely implemented using a computer network. Clouds represent logical computer networks comprised of a variety of networking components. Persons represent logical user audiences for the collaborative bookmarking solution.

For all instances above, the tag filter component may be integrated into the HTTP server as a functional subset, or via an extension mechanism, such as a plug-in or module, supported by the HTTP server. Alternatively, the tag filter is integrated into a network middleware component such as a router or firewall as a functional subset or via a defined extension mechanism. As another option, the tag filter component is integrated into a web application middleware component such as a web application server or web portal component as a functional subset, or via a defined extension mechanism. Other options include integrating the tag filter into the Collaborative Bookmarking component as a functional subset, or via a defined extension mechanism or into a web application security component such as an authorization server as a functional subset or via a defined extension mechanism.

In a further embodiment, the method of an embodiment herein may be implemented within or between one or more computer systems, by executing computer-readable program code stored on computer-readable media. The computer-readable media may include, for example, any number or mixture of fixed or removable media (such as one or more fixed disks, random access memories (RAMs), read-only memories (ROMs), or compact discs), at either a single location or distributed over a network. The computer-readable program code may include, for example, instructions embodied in software or firmware.

The computer-readable program code may include various components, such as program code, code to display a user interface, and code to instruct authentication of users of the system, code to set up a collaborative bookmarking system, code to permit search requests to the collaborative bookmarking system, code to retrieve search results tags from the collaborative bookmarking system, code to filter the search result tags, and code to send the filtered search results to the user.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

What is claimed is:

1. A collaborative bookmarking system that is accessible by a first public user through a public internet and also accessible by a first corporate user through a corporate intranet, the system comprising:
   a collaborative bookmarking database;
   a first tag filter module;
   a first HTTP server machine; and
   a second HTTP server machine;
   wherein:
   the collaborative marking database receives and maintains collaborative bookmarking data on an ongoing basis;
   the collaborative bookmarking data includes a plurality of tags and respectively associated sets of URL address(es), with the tags and respectively associated sets of URL addresses being supplied by users of the collaborative bookmarking system;
   the first HTTP server machine:
      (i) receives a first tag request from the public user through the public internet,
      (ii) requests a first associated set of URL address(es), corresponding to the first tag request, from the collaborative bookmarking database,
      (iii) receives a first filtered associated set of URL address(es) from the first tag filter, and
      (iv) returns the first filtered associated set of URL address(es) to the public user through the public internet;
   the second HTTP server machine:
      (i) receives a second tag request from the corporate user through the corporate intranet,
      (ii) requests a second associated set of URL address(es), corresponding to the second tag request, from the collaborative bookmarking database,
      (iii) receives the second associated set of URL address(es) from the collaborative bookmarking database, and
      (iv) returns the second associated set of URL address(es) to the corporate user through the corporate intranet; and
   the first tag filter module:
      (i) receives a first associated set of URL address(es) from the collaborative bookmarking database,
      (ii) filters the first associated set of URL address(es) to yield a first filtered set of URL address(es) by removing URL address(es) corresponding to URL-denoted data portions that are not freely publically accessible, and
      (iii) sends the first filtered set of URL address(es) to the first HTTP server machine.

2. The system of claim 1 further comprising:
   a third HTTP server machine; and
   a second tag filter;
   wherein:
   the third HTTP server machine:
      (i) receives a third tag request from a partner user through a partner intranet,
      (ii) requests a third associated set of URL address(es), corresponding to the third tag request, from the collaborative bookmarking database,
      (iii) receives a second filtered associated set of URL address(es) from the second tag filter, and
      (iv) returns the second filtered associated set of URL address(es) to the partner user through the partner intranet; and
   the second tag filter module:
      (i) receives a third associated set of URL address(es) from the collaborative bookmarking database,
      (ii) filters the third associated set of URL address(es) to yield a second filtered set of URL address(es) by removing URL address(es) corresponding to URL-denoted data portions that are accessible at the corporate level of confidentiality, and
      (iii) sends the second filtered set of URL address(es) to the third HTTP server machine.

3. The system of claim 2 further comprising:
   a first authentication server authenticates the public user and thereby allow the public user access to the collaborative bookmarking system through the first HTTP server machine and the first tag filter module; and
   a second authentication server authenticates the partner user and thereby allow the partner user access to the collaborative bookmarking system through the third HTTP server machine and the second tag filter module.

* * * * *